(12) United States Patent
Zhu et al.

(10) Patent No.: US 12,445,862 B2
(45) Date of Patent: Oct. 14, 2025

(54) BEAM ADJUSTMENT METHOD AND DEVICE

(71) Applicant: BEIJING XIAOMI MOBILE SOFTWARE CO., LTD., Beijing (CN)

(72) Inventors: Yajun Zhu, Beijing (CN); Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 414 days.

(21) Appl. No.: 18/012,569

(22) PCT Filed: Jul. 16, 2020

(86) PCT No.: PCT/CN2020/102456
§ 371 (c)(1),
(2) Date: Dec. 22, 2022

(87) PCT Pub. No.: WO2022/011649
PCT Pub. Date: Jan. 20, 2022

(65) Prior Publication Data
US 2023/0269602 A1  Aug. 24, 2023

(51) Int. Cl.
*H04W 16/28* (2009.01)
*H04L 5/00* (2006.01)

(52) U.S. Cl.
CPC .......... *H04W 16/28* (2013.01); *H04L 5/0051* (2013.01)

(58) Field of Classification Search
CPC ...... H04W 16/28; H04L 5/0051; H04B 7/063; H04B 7/0639; H04B 7/0617
See application file for complete search history.

(56) References Cited

U.S. PATENT DOCUMENTS

2015/0264583 A1   9/2015   Sundström et al.
2016/0066197 A1*  3/2016   Park .................... H04B 7/06952
                                                              370/329
(Continued)

FOREIGN PATENT DOCUMENTS

CN    108418618 A    8/2018
CN    110089054 A    8/2019
(Continued)

OTHER PUBLICATIONS

Supplementary Search Report for EP application 20945504.7 dated Mar. 6, 2024, (88p).
(Continued)

*Primary Examiner* — Ayaz R Sheikh
*Assistant Examiner* — Mang Boi Thawng
(74) *Attorney, Agent, or Firm* — Arch & Lake LLP (57) ABSTRACT

A beam adjustment method performed by a network device is provided. The method includes that the network device determines at least one beam adjustment parameter. The at least one beam adjustment parameter is configured to adjust a sending beam and a receiving beam within an information transmission interval. Furthermore, the network device sends the at least one beam adjustment parameter to a terminal. Moreover, the terminal receives the at least one beam adjustment parameter, and adjusts the beam within the information transmission interval based on the at least one beam adjustment parameter. A terminal and a network device that implement the beam adjustment method are also disclosed.

14 Claims, 7 Drawing Sheets

(56) References Cited

U.S. PATENT DOCUMENTS

| | | | |
|---|---|---|---|
| 2017/0041811 A1* | 2/2017 | Qiao | H04W 72/21 |
| 2017/0303265 A1* | 10/2017 | Islam | H04B 7/0639 |
| 2019/0223038 A1 | 7/2019 | Yang et al. | |
| 2019/0349152 A1* | 11/2019 | Islam | H04B 7/088 |
| 2020/0163074 A1* | 5/2020 | Tang | H04W 72/23 |
| 2020/0313827 A1* | 10/2020 | Noh | H04B 7/088 |
| 2020/0322812 A1* | 10/2020 | Shi | H04W 16/28 |

FOREIGN PATENT DOCUMENTS

| | | | |
|---|---|---|---|
| CN | 110278014 A | | 9/2019 |
| CN | 111264036 A | | 6/2020 |
| WO | 2018053767 A1 | | 3/2018 |
| WO | 2020013645 A1 | | 1/2020 |

OTHER PUBLICATIONS

International Search Report of PCT/CN2020/102456 dated Apr. 16, 2021, (4p).
CATT, "Beam management for control and data channel", 3GPP TSG RAN WG1 AH_NR Meeting, R1-1700192, Spokane, USA Jan. 16-20, 2017,(5p).
Indian Office Action issued to Indian Application No. 202347003618 dated May 24, 2023 with partial English translation, (5p).
CNOA1 issued to Chinese Application No. 202080001599.4 dated Apr. 22, 2023 with English translation, (15p).

* cited by examiner

BEAM ADJUSTMENT METHOD AND DEVICE

CROSS-REFERENCE TO RELATED APPLICATION

This application is the U.S. national phase application of International Application No. PCT/CN2020/102456, filed on Jul. 16, 2020, the entire contents of which are incorporated herein by reference for all purposes.

TECHNICAL FIELD

The present disclosure relates to a field of communication technologies, and particularly to a method and an apparatus for adjusting a beam, and a storage medium.

BACKGROUND

With the development of communication technologies, a low-capability and low-power-consumption terminal is introduced in enhanced mobile broadband (eMBB), large-scale machine-type communication (mMTC) and ultra-reliable and low-latency communication (URLLC) scenarios.

In the related art, for the low-capability and low-power-consumption terminal, 5G NR achieves coverage enhancement by repeatedly sending information such as control information or data information (repetition for information). During repetition for control information or data information, the terminal determines a quasi co-location (QCL) reference beam according to a transmission configuration indicator (TCI) sent by a network device before repetition, thereby determining a receiving beam and a sending beam for repeatedly sending information during repetition.

However, for the low-capacity and low-power-consumption terminal, the number of repetitions may be large (up to hundreds of times, even thousands of times). A terminal position and a channel state may vary during repetition.

SUMMARY

According to a first aspect of the present disclosure, a method for adjusting a beam is provided, which is performed by a network device. The method for adjusting the beam includes:
determining at least one beam adjustment parameter, where the at least one beam adjustment parameter is configured to adjust a beam within an information transmission interval; and sending the at least one beam adjustment parameter to a terminal.

According to a second aspect of the present disclosure, a method for adjusting a beam is provided, which is applied to a terminal. The method for adjusting the beam includes:
receiving at least one beam adjustment parameter, where the at least one beam adjustment parameter is configured to adjust a beam within an information transmission interval; and adjusting the beam within the information transmission interval based on the at least one beam adjustment parameter.

According to a third aspect of the present disclosure, a network device is provided. The network device includes a processor and a memory configured to store instructions executable by the processor. The processor is configured to perform the method described in the first aspect by executing the instructions stored in the memory.

According to a fourth aspect of the present disclosure, a terminal is provided. The terminal includes a processor and a memory configured to store instructions executable by the processor. The processor is configured to perform the method described in the second aspect by executing the instructions stored in the memory.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The embodiments will be described in detail here, and examples thereof are shown in the accompanying drawings. When the following descriptions refer to the accompanying drawings, unless otherwise indicated, the same numbers in different drawings represent the same or similar elements. The implementations described in the following embodiments do not represent all implementations consistent with the present disclosure. Rather, they are merely examples of apparatuses and methods consistent with some aspects of the disclosure as detailed in the appended claims.

Figure 1:
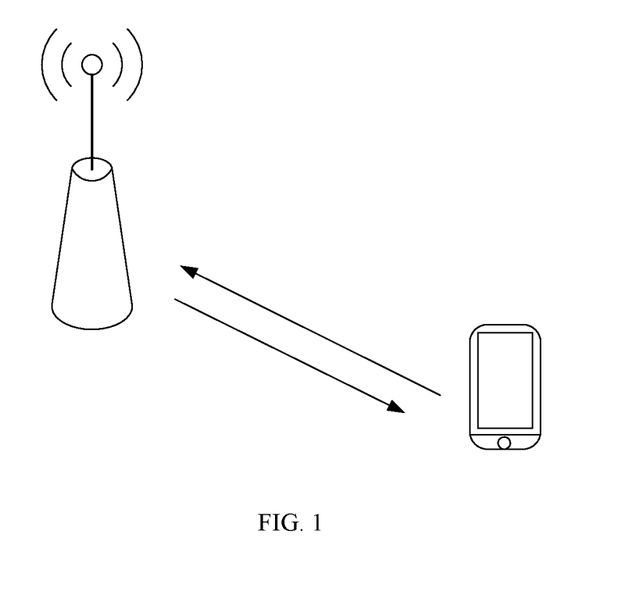
FIG. 1 is a diagram illustrating an architecture of a wireless communication system according to an embodiment.

The access method in embodiments of the present disclosure may be applied to a wireless communication system as illustrated in FIG. 1. As illustrated in FIG. 1, the wireless communication system includes a terminal and a network device. The terminal and the network device send and receive information through wireless resources.

It may be understood that, the wireless communication system as illustrated in FIG. 1 is only exemplary, and the wireless communication system further may include other network devices, for example, further may include a core network device, a wireless relay device and a wireless backhaul device not shown in FIG. 1. The number of network devices and the number of terminals included in the wireless communication system are not limited in embodiments of the present disclosure.

It may be further understood that, the wireless communication system in embodiments of the present disclosure is a network that provides a wireless communication function.

The wireless communication system may adopt different communication technologies, for example, code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA) and carrier sense multiple access with collision avoidance. A network may be divided into a 2G (generation) network, a 3G network, a 4G network, or a future evolution network, for example, a 5G network, based on capacities, rates, latencies and other factors of different networks. The 5G network may also be referred to as a new radio (NR) network. For ease of description, a wireless communication network is simply referred to as the network sometimes in the disclosure.

Further, the network device involved in the present disclosure may also be referred to as a wireless access network device. The wireless access network device may be an access point (AP), a wireless relay node, a wireless backhaul node, a transmission point (TP), or a transmission and reception point (TRP), etc., in a base station, an evolved node B (a base station), a home base station and a wireless fidelity (WiFi) system, or may be a gNB in the NR system, or may also be a component constituting a base station or a part of a device. The network device further may be a vehicle device in an Internet of Vehicles (V2X) communication system. It should be understood that, a specific technology and a specific device form adopted by the network device are not limited in embodiments of the present disclosure.

Further, the terminal involved in the present disclosure further may be referred to as a terminal device, a user equipment (UE), a mobile station (MS), a mobile terminal (MT), etc., and is a device that provides voice and/or data connectivity to a user. For example, the terminal may be a handheld device with a wireless connection function or a vehicle device, etc. At present, some examples of the terminal include a mobile phone, a pocket personal computer (PPC), a palm computer, a personal digital assistant (PDA), a notebook computer, a tablet computer, a wearable device, or a vehicle device. In addition, the terminal device further may be a vehicle device in an Internet of Vehicles (V2X) communication system. It should be understood that, a specific technology and a specific device form adopted by the terminal are not limited in embodiments of the present disclosure.

In embodiments of the present disclosure, the 5G network is taken as an example for illustration. 5G application scenarios include enhanced mobile broadband (eMBB), large-scale machine-type communication (mMTC) and ultra-reliable and low-latency communication (URLLC). To support URLLC, a URLLC function is introduced in 5G NR Rel-15, and NR URLLC is further enhanced in enhanced URLLC (eURLLC) and Industrial Internet of Things work items in Rel-16.

One important goal of 5G is to enable Industrial Internet. 5G may become a catalyst of a next-wave industrial transformation and digitization, thereby improving flexibility, improving productivity and efficiency, reducing maintenance cost, and improving operation safety. The device in such an environment includes a pressure sensor, a humidity sensor, a thermometer, a motion sensor, an accelerometer, an actuator, etc. A large-scale industrial wireless sensor network not only requires to include very high URLLC services, but also includes relatively low-end services with small device form requirements. At the same time, applications in vertical industries such as smart cities cover data collection and processing, to monitor and control urban resources more effectively, and provide services for urban residents.

In addition, the wearable device includes a smart watch, a smart ring, a health-related device, a medical monitoring device, etc. The above scenario requires a device with a small size, a low complexity, energy saving, a wide coverage range, etc. Therefore, a low-capability and low-power-consumption terminal is introduced in a 5G scenario.

The low-capability and low-power-consumption terminal supports retransmissions of information within an information transmission interval to achieve coverage enhancement. For example, coverage enhancement is achieved by repetition of information such as control information or data information. In the related art, the network device and the terminal perform beam transmission using a beam before the information transmission interval during the information transmission interval, however, the beam determined before the information transmission interval cannot match change of a terminal position and a channel, thereby causing the beam direction of the network device and the terminal to deviate from a correct direction, resulting in a decrease in the transmission performance. For example, in a case that the terminal and/or the network device is moving, during the repeated transmission of control information or data information, the reception performance may lead to a decrease if the beam direction cannot be adjusted in time.

For this purpose, a method for adjusting a beam is provided in embodiments of the present disclosure. A beam adjustment parameter for adjusting a beam within an information transmission interval is determined, and the beam within the information transmission interval is adjusted based on the beam adjustment parameter, thereby avoiding the beam direction of the network device and the terminal deviating from a correct direction, which improves the communication performance.

Figure 2:
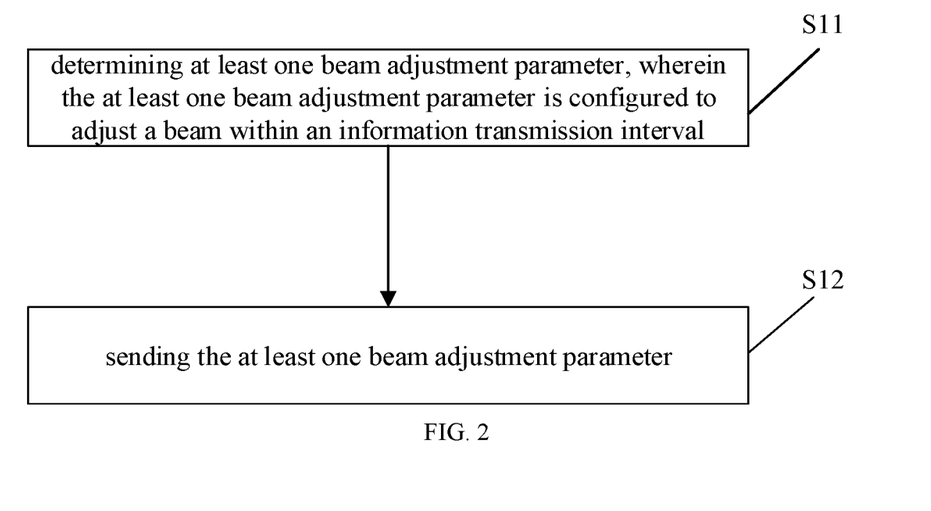
FIG. 2 is a flowchart illustrating a method for adjusting a beam according to an embodiment.

FIG. 2 is a flowchart illustrating a method for adjusting a beam according to an embodiment. As illustrated in FIG. 2, the method for adjusting the beam is applied to a network device, and includes the following steps.

At step S11, at least one beam adjustment parameter is determined.

The at least one beam adjustment parameter is configured to adjust a beam within an information transmission interval.

At step S12, the at least one beam adjustment parameter is sent.

In embodiments of the present disclosure, the at least one beam adjustment parameter for adjusting the beam within the information transmission interval is determined, and subsequently, the beam within the information transmission interval can be adjusted based on the at least one beam adjustment parameter, thereby avoiding the beam direction within the information transmission interval deviating from a correct direction, which improves the communication performance.

The method for adjusting the beam involved in embodiments of the present disclosure is illustrated in combination with the actual applications in embodiments of the present disclosure.

In an implementation of the present disclosure, the at least one beam adjustment parameter is predicted based on at least one determined beam. The network device in embodiments of the disclosure determines a beam based on a beam reference signal. For example, in an implementation, the network device sends a synchronization signal and PBCH block (SSB) or a channel-state information reference signal (CSI-RS). The terminal measures the SSB or the CSI-RS and reports a reference signal index, a layer 1 reference signal received power (L1 RSRP) and a PMI. A precoding matrix indicated by the PMI consists of a one-dimensional vector or a two-dimensional vector. The network device calculates a corresponding sending beam and receiving beam based on the reference signal index, the L1 RSRP and the PMI reported by the terminal. In another implementation, the terminal sends a sounding reference signal (SRS). The network device measures a received SRS signal, and calculates the corresponding sending beam and receiving beam. The network device may determine the most matching sending beam or receiving beam in the sending beams and the receiving beams calculated, further to determine the sending beam or the receiving beam.

In embodiments of the present disclosure, the network device may predict a subsequent beam based on at least one sending beam or receiving beam determined, to obtain the at least one beam adjustment parameter for adjusting the subsequent beam.

In an implementation, the at least one beam for predicting the subsequent beam include one or more beams determined in a specific time. In embodiments of the present disclosure, the network device may predict the at least one beam adjustment parameter for adjusting the subsequent beam based on one or more beams determined in the specific time.

In embodiments of the present disclosure, the at least one beam adjustment parameter include at least one beam adjustment angle and at least one beam adjustment period. The beam adjustment angle may be understood as an amount of beam change. The beam adjustment period may be understood as a rate of beam change. In embodiments of the present disclosure, the subsequent beam is predicted by the beam adjustment angle representing the amount of beam change and the beam adjustment period representing the rate of beam change, which may predict the rate of beam change and the amount of beam change of the subsequent beam.

The at least one beam adjustment angle include one or more beam adjustment angles in one or more dimensional beam directions. The dimension of the beam direction in embodiments of the present disclosure may be determined based on an actual beam direction dimension. For example, the dimension of the beam direction may be a horizontal dimension, a vertical dimension, or a horizontal dimension and a vertical dimension.

In embodiments of the present disclosure, the network device sends the beam adjustment angle and the beam adjustment period to the terminal, and subsequently, the terminal and the network device may adjust the beam based on the beam adjustment angle and the beam adjustment period.

In embodiments of the present disclosure, the network device may determine a reference beam for adjusting the beam subsequently. The reference beam may be determined in determined beams in the network device. For example, the beam recently used in the determined beams is determined as the reference beam. In embodiments of the present disclosure, the reference beam also may be a new beam directly specified by the network device. The network device may determine QCL index information of the reference beam after determining the reference beam. The network device sends index information of the reference beam to the terminal.

Figure 3:
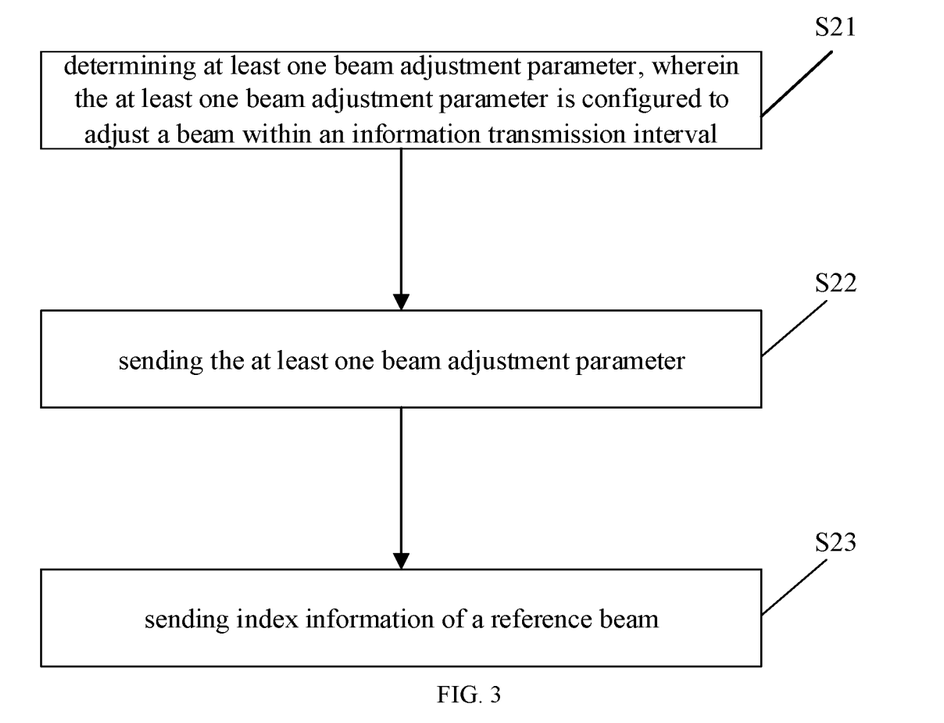
FIG. 3 is a flowchart illustrating a method for adjusting a beam according to an embodiment.

FIG. 3 is a flowchart illustrating a method for adjusting a beam according to an embodiment. As illustrated in FIG. 3, the method for adjusting the beam is applied to a network device. The method for adjusting the beam as illustrated in FIG. 3 includes steps S21 to S23.

Step S21 and step S22 are the same as step S11 and step S12, which will not be repeated in embodiments of the present disclosure.

At step S23, index information of a reference beam is sent.

In embodiments of the present disclosure, the reference beam may be determined in determined beams, and also may be a subsequent new specified beam.

The index information of the reference beam may be a QCL index of the beam. The QCL index may be determined based on TCI.

In embodiments of the present disclosure, the network device subsequently determines the reference beam based on the index information of the reference beam, and adjusts the beam based on the reference beam and the at least one beam adjustment parameter.

The network device may adjust a receiving beam, also may adjust a sending beam, and also may adjust the sending beam and the receiving beam.

In an implementation, the network device adjusts a direction of the sending beam within the information transmission interval based on the reference beam and the at least one beam adjustment parameter, when adjusting the sending beam. The network device adjusts a direction of the receiving beam within the information transmission interval based on the reference beam and the at least one beam adjustment parameter, when adjusting the receiving beam.

In an implementation, the reference beam may be a reference sending beam.

In an implementation, the direction of the sending beam within the information transmission interval may be adjusted according to a specified beam adjustment period and a specified beam adjustment angle on the basis of a dimensional beam direction corresponding to a reference sending beam, when adjusting the direction of the sending beam based on the reference beam and the at least one beam adjustment parameter.

That is, the network device adjusts a specified dimensional direction of the sending beam within the information transmission interval according to the specified dimensional direction of a reference sending beam, a beam adjustment period corresponding to the specified dimensional and a beam adjustment angle corresponding to the specified dimensional direction; wherein, the specified dimensional direction may be at least one of: a horizontal dimension; or a vertical dimension.

The reference sending beam includes a sending beam recently used before the information transmission interval or a sending beam specified by the network device.

In an implementation, the reference beam may be a reference receiving beam.

In an implementation, the direction of the receiving beam within the information transmission interval may be adjusted according to the specified beam adjustment period and the specified beam adjustment angle on the basis of a dimensional beam direction corresponding to a reference receiving beam, when adjusting the direction of the receiving beam within the information transmission interval based on the reference beam and the at least one beam adjustment parameter.

That is, the network device adjusts a specified dimensional beam direction of the receiving beam within the information transmission interval according to the specified dimensional beam direction of a reference receiving beam, a beam adjustment period and a beam adjustment angle in the specified dimensional beam direction.

The reference receiving beam includes a receiving beam recently used before the information transmission interval or a receiving beam specified by the network device.

In an example, the at least one beam adjustment angle determined by the network device include one or more angle values. In this embodiment, the beam adjustment angles include two angle values $\alpha\_1$ and $\alpha\_2$, and the beam adjustment period is $\Delta T$ as an example for illustration. The beam adjustment period $\Delta T$ may represent several time slots. The network device may perform a cumulative beam adjustment using $\alpha\_1$ and $\alpha\_2$ in a first dimensional beam direction and in a second dimensional beam direction respectively every other $\Delta T$ (which may represent several time slots) on the basis of the reference beam direction, within the information transmission interval such as repeated sending or repeated receiving.

In embodiments of the present disclosure, the reference beam may be the sending beam or the receiving beam in the beam direction corresponding to the QCL recently sent or received.

In embodiments of the present disclosure, the network device determines the at least one beam adjustment parameter, and adjusts the beam within the information transmission interval based on the at least one beam adjustment parameter, so that the beam direction within the information transmission interval (during repetition of control information or data information) may be adjusted in a moving situation, to avoid the problem that the receiving performance decreases since the beam direction cannot be adjusted in time.

In embodiments of the present disclosure, the network device sends the determined at least one beam adjustment parameter to the terminal, and the terminal may adjust the beam within the information transmission interval based on the at least one beam adjustment parameter.

Figure 4:
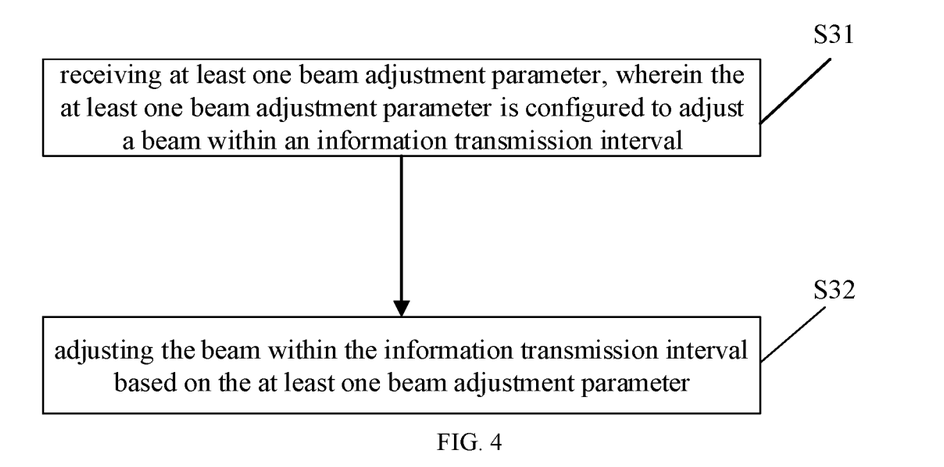
FIG. 4 is a flowchart illustrating a method for adjusting a beam according to an embodiment.

FIG. 4 is a flowchart illustrating a method for adjusting a beam according to an embodiment. As illustrated in FIG. 4, the method for adjusting the beam is applied to a terminal, and includes the following steps.

At step S31, at least one beam adjustment parameter is received. The at least one beam adjustment parameter is configured to adjust a beam within an information transmission interval.

At step S32, the beam within the information transmission interval is adjusted based on the at least one beam adjustment parameter.

In embodiments of the present disclosure, the terminal receives the at least one beam adjustment parameter sent by a network device, and adjusts the beam within the information transmission interval based on the at least one beam adjustment parameter, which may avoid the beam direction of the network device and the terminal deviating from a correct direction, and improve the communication performance.

In embodiments of the present disclosure, the at least one beam adjustment parameter received by the terminal is predicted by the network device based on at least one determined beam.

In an implementation, the at least one determined beam for predicting the beam adjustment parameter include one or more beams determined in a specified time. The network device predicts the at least one beam adjustment parameter based on one or more beams in the specified time and sends the at least one beam adjustment parameter to the terminal, and the terminal receives the at least one beam adjustment parameter sent by the network device, and adjusts the beam direction within the information transmission interval.

In an implementation, the at least one beam adjustment parameter for adjusting the beam within the information transmission interval include at least one beam adjustment angle and at least one beam adjustment period. The at least one beam adjustment angle include one or more beam adjustment angles in one or more dimensional beam directions.

Figure 5:
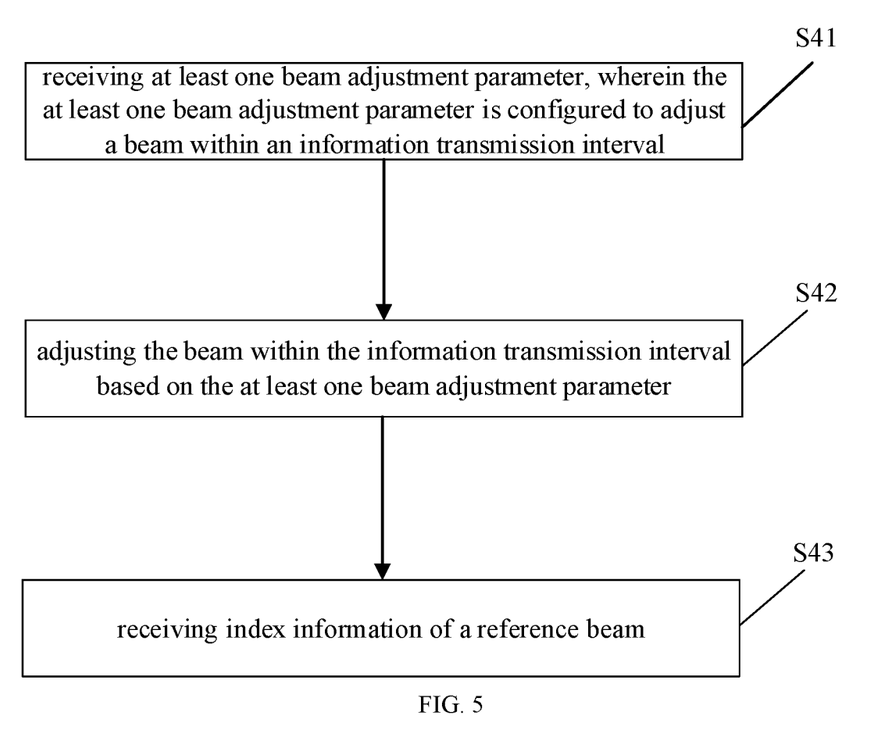
FIG. 5 is a flowchart illustrating a method for adjusting a beam according to an embodiment.

FIG. 5 is a flowchart illustrating a method for adjusting a beam according to an embodiment. As illustrated in FIG. 5, the method for adjusting the beam is applied to a terminal. The method for adjusting the beam as illustrated in FIG. 5 includes steps S41 to S43.

Step S41 and Step S42 are the same as step S21 and step S22, which will not be elaborated in embodiments of the present disclosure.

At step S43, index information of a reference beam is received.

In embodiments of the present disclosure, the reference beam may be determined in determined beams, and also may be a subsequent new specified beam.

The index information of the reference beam may be a QCL index of a beam. The QCL index may be determined based on TCI.

In embodiments of the present disclosure, the terminal may determine the reference beam based on the index information of the reference beam, and adjust the beam direction based on the reference beam and the at least one beam adjustment parameter. For example, a direction of a sending beam within the information transmission interval is adjusted based on the reference beam and the at least one beam adjustment parameter, or a direction of a receiving beam within the information transmission interval is adjusted based on the reference beam and the at least one beam adjustment parameter, or directions of the sending beam and the receiving beam within the information transmission interval are adjusted based on the reference beam and the at least one beam adjustment parameter.

In an implementation, the direction of the sending beam within the information transmission interval is adjusted according to a specified beam adjustment period and a specified beam adjustment angle on the basis of a dimensional beam direction corresponding to a reference sending beam, when adjusting the direction of the sending beam within the information transmission interval based on the reference beam and the at least one beam adjustment parameter. The reference sending beam includes a sending beam recently used before the information transmission interval or a sending beam subsequently specified by the network device.

In an implementation, the direction of the receiving beam within information transmission interval may be adjusted according to the specified beam adjustment period and the specified beam adjustment angle on the basis of a dimensional beam direction corresponding to a reference receiving beam, when adjusting the direction of the receiving beam within the information transmission interval based on the reference beam and the at least one beam adjustment parameter. The reference receiving beam includes a receiving beam recently used before the information transmission interval or a receiving beam subsequently specified by the network device.

In an example, the at least one beam adjustment angle in the beam adjustment parameter determined by the terminal include one or more angle values. In this embodiment, the beam adjustment angels include two angle values $\alpha\_3$ and $\alpha\_4$, and the beam adjustment period is $\Delta T$ as an example for illustration. The beam adjustment period $\Delta T$ may represent several time slots. The terminal may perform a cumulative beam adjustment using $\alpha\_3$ and $\alpha\_4$ in a first dimensional beam direction and in a second dimensional beam direction respectively every other $\Delta T$ (which may represent several time slots) on the basis of the reference beam direction, within the information transmission interval such as repetition.

In embodiments of the present disclosure, the terminal receives the at least one beam adjustment parameter sent by the network device, and adjusts the beam within the information transmission interval based on the at least one beam adjustment parameter, which may avoid the beam direction of the network device and the terminal deviating from a correct direction, and improve the communication performance.

The method for adjusting the beam provided in embodiments of the present disclosure may be applied to an interaction process between the terminal and the network device. The interaction process between the terminal and the network device may refer to a process of achieving beam adjustment between the terminal and the network device in the above embodiments, which will not be elaborated here.

The above implementation process of the method for adjusting the beam is illustrated in an example of the present disclosure.

Figure 6:
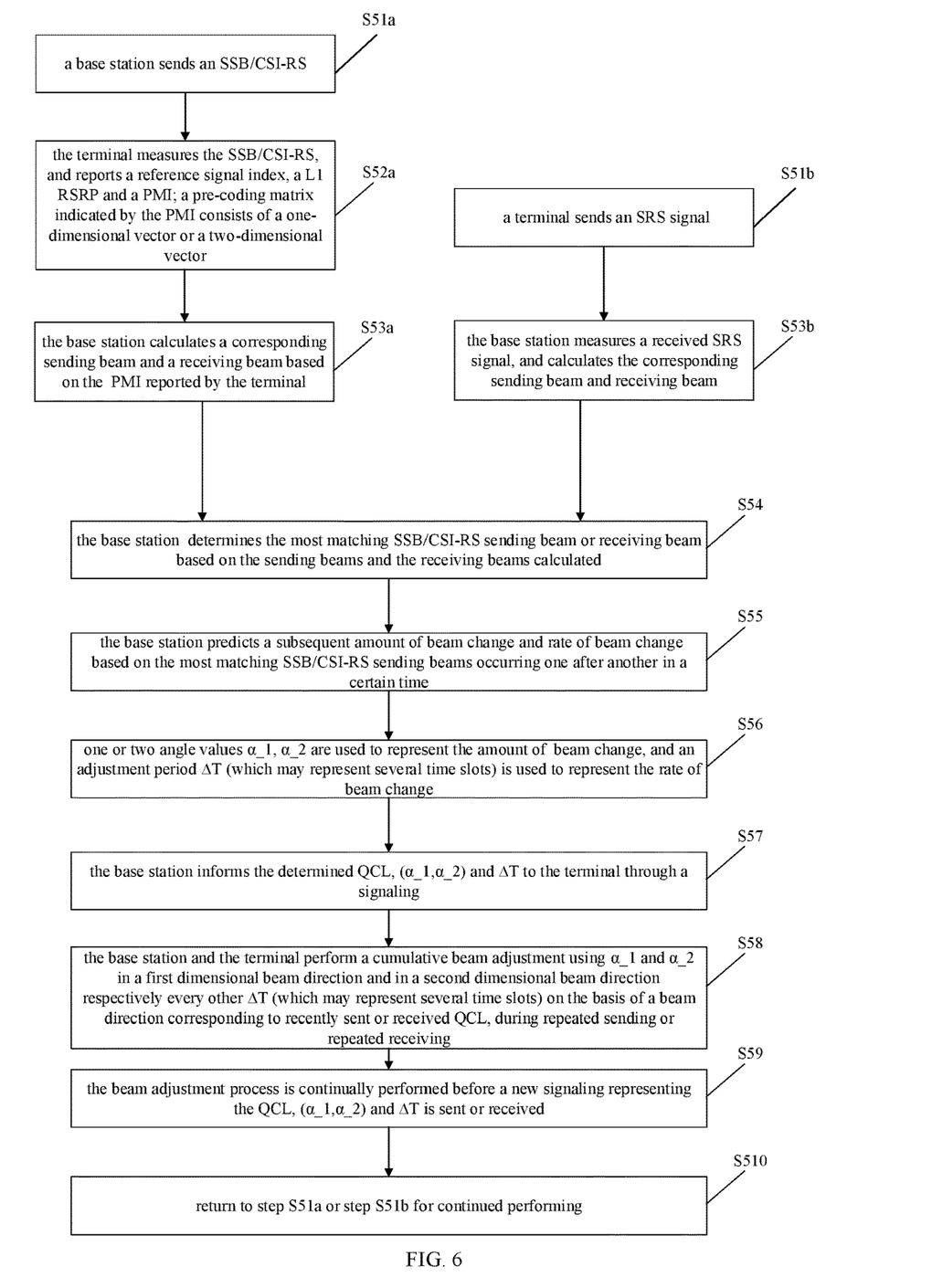
FIG. 6 is a flowchart illustrating a method for adjusting a beam according to an embodiment.

FIG. 6 is a flowchart illustrating implementation of a method for adjusting a beam according to an embodiment. The network device is a base station as an example for illustration. As illustrated in FIG. 6, the method includes the following steps.

At step S51*a*, a base station sends an SSB/CSI-RS.

At step S51*b*, a terminal sends an SRS signal.

At step S52*a*, the terminal measures the SSB/CSI-RS, and reports a reference signal index, a L1 RSRP and a PMI, in which a precoding matrix indicated by the PMI consists of a one-dimensional vector or a two-dimensional vector.

At step S53*a*, the base station calculates a corresponding sending beam and receiving beam based on the reference signal index, the L1 RSRP and the PMI reported by the terminal.

At step S53*b*, the base station measures the received SRS signal, and calculates the corresponding sending beam and the receiving beam.

At step S54, the base station determines the most matching SSB/CSI-RS sending beam and receiving beam based on the sending beams and the receiving beams calculated, which are represented by the QCL index.

At step S55, the base station predicts a subsequent amount of beam change and rate of beam change (a beam adjustment angle and a beam adjustment period) based on the most matching SSB/CSI-RS sending beams occurring one after another in a certain time.

At step S56, one or two angle values $\alpha\_1$, $\alpha\_2$ are used to represent the amount of beam change, and an adjustment period $\Delta T$ (which may represent several time slots) is used to represent the rate of beam change.

At step S57, the base station informs the determined QCL, ($\alpha\_1$, $\alpha\_2$) and $\Delta T$ to the terminal through a signaling.

At step S58, the base station and the terminal perform a cumulative beam adjustment using $\alpha\_1$ and $\alpha\_2$ in a first dimensional beam direction and in a second dimensional beam direction respectively every other $\Delta T$ (which may represent several time slots) on the basis of a beam direction corresponding to recently sent or received QCL, during repeated sending or repeated receiving.

At step S59, the beam adjustment process at step S58 is continually performed before a new signaling representing the QCL, ($\alpha\_1$, $\alpha\_2$) and $\Delta T$ is sent or received.

At step S510, return to step S51*a* and step S51*b* for continued performing.

In the method for adjusting the beam provided in embodiments of the present disclosure, the beam within the information transmission interval may be adjusted based on the beam adjustment parameter by determining the beam adjustment parameter for adjusting the beam within the information transmission interval, thereby avoiding the beam direction of the network device and the terminal deviating from a correct direction, which improves the communication performance.

Based on the same conception, an apparatus for adjusting a beam is further provided in embodiments of the present disclosure.

It may be understood that, the apparatus for adjusting the beam provided in embodiments of the present disclosure includes hardware structures and/or software modules that perform corresponding functions in order to achieve the above functions. In combination with modules and algorithm steps of examples described in embodiments of the present disclosure, the embodiments of the present disclosure may be implemented in the form of a hardware or a combination of a hardware and a computer software. Whether a certain function is executed by a hardware or a computer software driving a hardware depends on specific applications and design constraints of the technical solution. Those skilled in the art may adopt different methods for each specific application to implement the described functions, but such implementation should not be considered as beyond the scope of the technical solutions in embodiments of the present disclosure.

Figure 7:
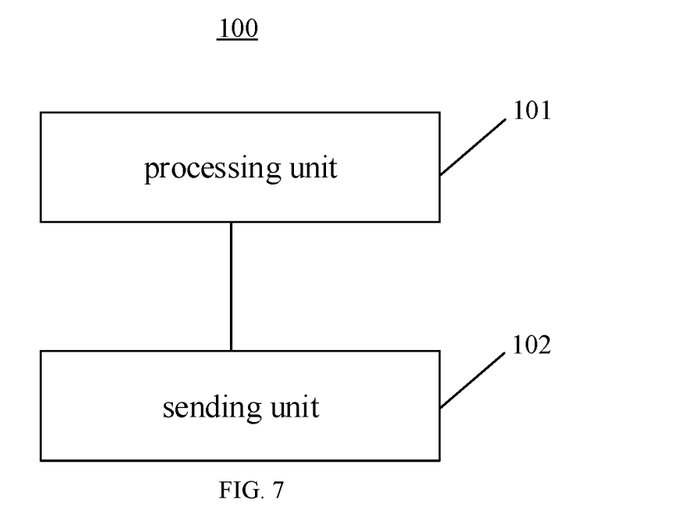
FIG. 7 is a block diagram illustrating an apparatus for adjusting a beam according to an embodiment.

FIG. 7 is a block diagram illustrating an apparatus for adjusting a beam according to an embodiment. As illustrated 7, the apparatus 100 for adjusting the beam is applied to a network device. The apparatus 100 for adjusting the beam includes a processing unit 101 and a sending unit 102.

The processing unit 101 is configured to determine at least one beam adjustment parameter. The beam adjustment parameter is configured to adjust a beam within an information transmission interval. The sending unit 102 is configured to send the at least one beam adjustment parameter.

In an implementation, the at least one beam adjustment parameter is predicted based on at least one determined beam.

In an implementation, the at least one determined beam include one or more beams determined in a specific time.

In an implementation, the at least one beam adjustment parameter include at least one beam adjustment angle and at least one beam adjustment period.

In an implementation, the at least one beam adjustment angle include one or more beam adjustment angles in one or more dimensional beam directions.

In an implementation, the sending unit is 102 is further configured to: send index information of a reference beam.

In an implementation, the processing unit 101 is further configured to perform at least one of: adjusting a direction of a sending beam within the information transmission interval based on the reference beam and the at least one beam adjustment parameter; or, adjusting a direction of a receiving beam within the information transmission interval based on the reference beam and the at least one beam adjustment parameter.

In an implementation, the processing unit 101 is configured to adjust the direction of the sending beam based on the reference beam and the at least one beam adjustment parameter by:

adjusting the direction of the sending beam within the information transmission interval according to a specified beam adjustment period and a specified beam adjustment angle on the basis of a dimensional beam direction corresponding to a reference sending beam.

In an implementation, the reference sending beam includes a sending beam recently used before the information transmission interval or a specified sending beam.

In an implementation, the processing unit 101 is configured to adjust the direction of the receiving beam within the information transmission interval based on the reference beam and the at least one beam adjustment parameter by:

adjusting the direction of the receiving beam within the information transmission interval according to the specified beam adjustment period and the specified beam adjustment angle on the basis of a dimensional beam direction corresponding to a reference receiving beam.

In an implementation, the reference receiving beam includes a receiving beam recently used before the information transmission interval or a specified receiving beam.

Figure 8:
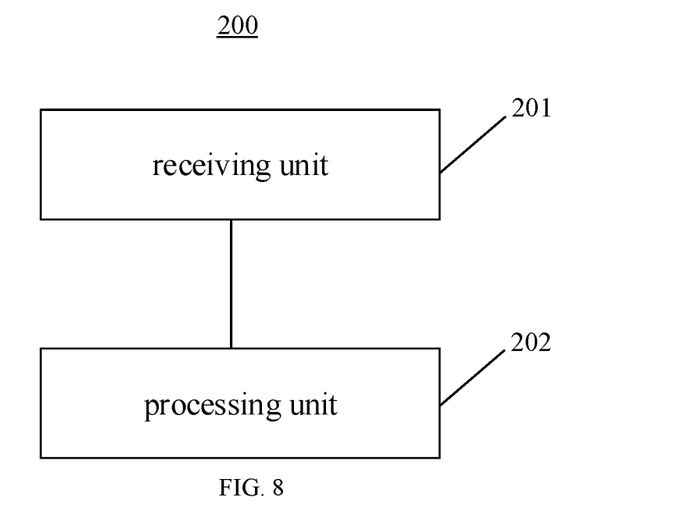
FIG. 8 is a block diagram illustrating an apparatus for adjusting a beam according to an embodiment.

FIG. 8 is a block diagram illustrating an apparatus for adjusting a beam according to an embodiment. As illustrated in FIG. 8, the apparatus 200 for adjusting the beam is applied to a terminal, and includes a receiving unit 201 and a processing unit 202.

The receiving unit 201 is configured to receive at least one beam adjustment parameter. The at least one beam adjustment parameter is configured to adjust a beam within an information transmission interval. The processing unit 202 is configured to adjust the beam within the information transmission interval based on the at least one beam adjustment parameter.

In an implementation, the at least one beam adjustment parameter is predicted by a network device based on at least one determined beam.

In an implementation, the at least one determined beam include one or more beams determined in a specified time.

In an implementation, the at least one beam adjustment parameter include at least one beam adjustment angle and at least one beam adjustment period.

In an implementation, the at least one beam adjustment angle include one or more beam adjustment angles in one or more dimensional beam directions.

In an implementation, the receiving unit 201 is further configured to: receive index information of a reference beam.

In an implementation, the processing unit 202 is further configured to perform at least one of: adjusting a direction of a sending beam within the information transmission interval based on the reference beam and the at least one beam adjustment parameter; or, adjusting a direction of a receiving beam within the information transmission interval based on the reference beam and the at least one beam adjustment parameter.

In an implementation, the processing unit 202 is further configured to adjust the direction of the sending beam within the information transmission interval based on the reference beam and the at least one beam adjustment parameter by:

adjusting the direction of the sending beam within the information transmission interval according to a specified beam adjustment period and a specified beam adjustment angle on the basis of a dimensional beam direction corresponding to a reference sending beam.

In an implementation, the reference sending beam includes a sending beam recently used before the information transmission interval or a specified sending beam.

In an implementation, the processing unit 202 is further configured to adjust the direction of the receiving beam within the information transmission interval based on the reference beam and the at least one beam adjustment parameter by:

adjusting the direction of the receiving beam within the information transmission interval according to the specified beam adjustment period and the specified beam adjustment angle on the basis of a dimensional beam direction corresponding to a reference receiving beam.

In an implementation, the reference receiving beam includes a receiving beam recently used before the information transmission interval or a specified receiving beam.

With regard to the apparatus in the above embodiments, the specific way in which each module performs the operation has been described in detail in the embodiments of the method and will not be elaborated here.

Figure 9:
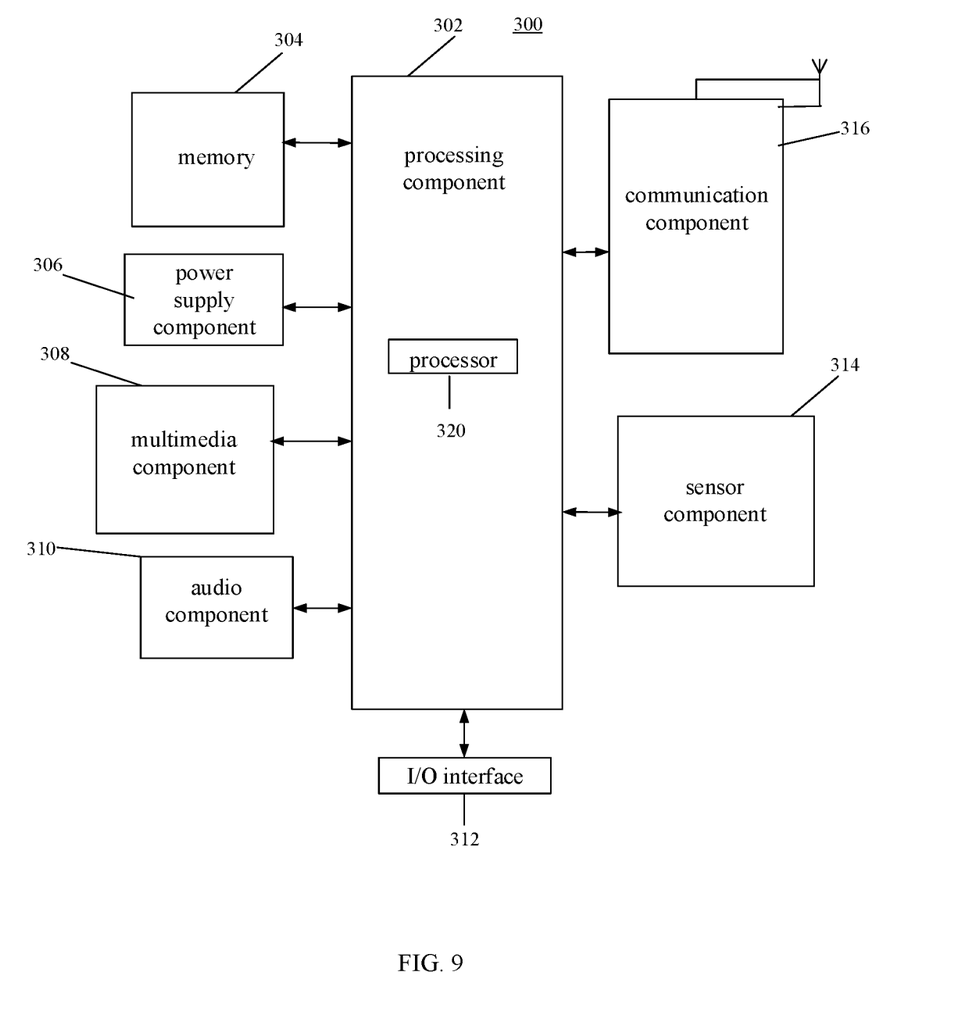
FIG. 9 is a block diagram illustrating an apparatus for adjusting a beam according to an embodiment.

FIG. 9 is a block diagram illustrating an apparatus 300 for adjusting a beam according to an embodiment. For example, the apparatus 300 may be a mobile phone, a computer, a digital broadcasting terminal, a messaging device, a game console, a tablet device, a medical equipment, a fitness equipment, a personal digital assistant, etc.

As illustrated in FIG. 9, the apparatus 300 may include one or more components: a processing component 302, a memory 304, a power supply component 306, a multimedia component 308, an audio component 310, an input/output (I/O) interface 312, a sensor component 314, and a communication component 316.

The processing component 302 generally controls the whole operation of the apparatus 300, such as the operations related to display, phone call, data communication, camera operation and recording operation. The processing component 302 may include one or more processors 320 to perform instructions, to complete all or part of blocks of the above method. In addition, the processing component 302 may include one or more modules for the convenience of interaction between the processing component 302 and other components. For example, the processing component 302 may include a multimedia module for the convenience of interaction between the multimedia component 308 and the processing component 302.

The memory 304 is configured to store all types of data to support the operation of the apparatus 300. Examples of the data include the instructions of any applications or methods operated on the apparatus 300, contact data, phone book data, messages, pictures, videos, etc. The memory 304 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 306 may provide power supply for all components of the apparatus 300. The power supply component 306 may include power supply management system, one or more power supplies, and other units related to generating, managing and distributing power for the apparatus 300.

The multimedia component 308 includes an output interface screen provided between the apparatus 300 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide action, but also detect the duration and pressure related to the touch or slide operation. In some embodiments, the multimedia component 308 includes a front camera and/or a rear camera. When the apparatus 300 is in an operation mode, such as a shooting mode or a video mode, the front camera or the rear camera may receive external multimedia data. Each front camera and rear camera may be a fixed optical lens system or an optical lens system with a focal length and an optical zoom capacity.

The audio component 310 is configured as an output and/or input signal. For example, the audio component 310 includes a microphone (MIC). When the apparatus 300 is in an operation mode, such as a call mode, a record mode, and a speech recognition mode, the microphone is configured to receive external audio signals. The audio signals received may be further stored in the memory 304 or sent via the communication component 316. In some embodiments, the audio component 310 further includes a speaker configured to output an audio signal.

The I/O interface 312 provides an interface for the processing component 302 and the peripheral interface module, and the peripheral interface module may be a keyboard, a click wheel, a button, etc. The buttons may include but not limited to a home button, a volume button, a start button and a lock button.

The sensor component 314 includes one or more sensors, configured to provide various aspects of status assessment for the device 300. For example, the sensor component 314 may detect the on/off state of the apparatus 300 and the relative positioning of the component. For example, the component is a display and a keypad of the apparatus 300. The sensor component 314 may further detect the location change of the apparatus 300 or one component of the apparatus 300, the presence or absence of contact between the user and the apparatus 300, the orientation or acceleration/deceleration of the apparatus 300, and the temperature change of the apparatus 300. The sensor component 314 may include a proximity sensor, which is configured to detect the existence of the objects nearby without any physical contact. The sensor component 314 may further include a light sensor such as a CMOS or CCD image sensor, which is configured in imaging applications. In some embodiments, the sensor component 314 may further include an acceleration transducer, a gyroscope sensor, a magnetic sensor, a pressure sensor or a temperature sensor.

The communication component 316 is configured for the convenience of wire or wireless communication between the apparatus 300 and other devices. The apparatus 300 may access wireless networks based on communication standard, such as WiFi, 2G or 3G, or their combination. In an embodiment, the communication component 316 receives broadcast signals or broadcast-related information from an external broadcast management system via a broadcast channel. In an embodiment, the communication component 316 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an embodiment, the apparatus 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an embodiment, a non-transitory computer readable storage medium is further provided which includes instructions, such as the memory 304 including instructions, wherein the instructions may be executed by the processor 320 of the apparatus 300 to complete the above methods. For example, the non-transitory computer readable storage medium may be a ROM, a random access memory (RAM), a CD-ROM, a magnetic tape, a floppy disk, an optical data storage device, etc.

Figure 10:
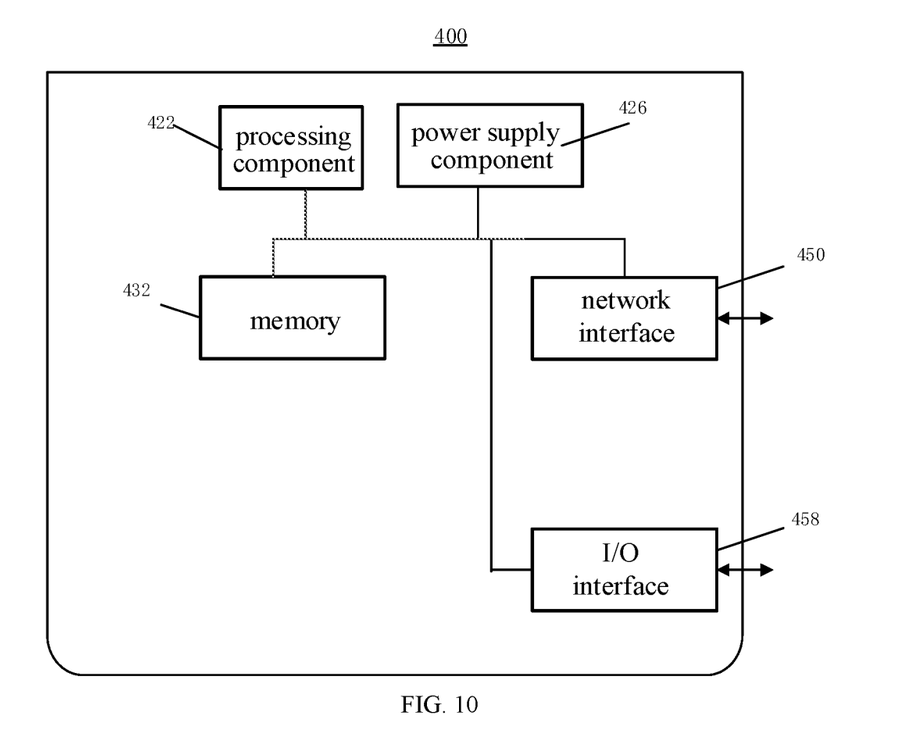
FIG. 10 is a block diagram illustrating an apparatus for adjusting a beam according to an embodiment.

FIG. 10 is a block diagram illustrating an apparatus 400 for adjusting a beam according to an embodiment. For example, the apparatus 400 may be provided as a server. Referring to FIG. 10, the apparatus 400 includes a processing component 422, which further includes one or more processors, and memory resources represented by a memory 432, which are configured to store instructions executed by the processing component 422, for example, an application. The application stored in the memory 432 may include one or more modules each of which corresponds to a set of instructions. In addition, the processing component 422 is configured to execute instructions, to perform the above method.

The apparatus 400 may further include one power supply component 426 configured to execute power management of the apparatus 400, and one wired or wireless network interface 450 configured to connect the apparatus 400 to a network, and one input/output (I/O) interface 458. The apparatus 400 may operate an operating system stored in the memory 432, for example, Windows Server™, Mac OS X™, Unix™, Linux™, and FreeBSD™.

The technical solution provided in embodiments of the present disclosure may include the following beneficial effect: the beam within the information transmission interval can be adjusted based on the at least one beam adjustment parameter by determining the at least one beam adjustment parameter for adjusting the beam within the information transmission interval, thereby avoiding the beam direction of the network device and the terminal deviating from a correct direction, which improves the communication performance.

It may be further understood that, "a plurality of" in the present disclosure means two or above, which is similar to other quantifiers. "and/or," describes the relationship of the association objects, indicating that there may exist three relationships, for example, A and/or B, may represent: any of existing A only, existing both A and B, or existing B only. The character "/" generally means the contextual object is a kind of "or" relationship. The singular forms "a," "the" and "said are also intended to include plural forms, unless the context clearly indicates otherwise.

It should be further understood that, although the terms "first," "second," "third," etc. may be configured to describe various information, such information shall not be limited to these terms. These terms are only used to distinguish the same type of information, rather than indicate a particular order or importance degree. In fact, "first," "second" and other similar descriptions may be used interchangeably. For example, subject to the scope of this present disclosure, first information may also be referred to as second information, and similarly, and second information may also be referred to as first information.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

It may be further understood that, even though operations are described in the drawings in a particular order, it should not be understood as requiring that such operations be performed in the particular order shown or in sequential order, or that all illustrated operations be performed to obtain desirable results. In certain circumstances, multitasking and parallel processing may be advantageous.

After considering the specification and practicing the disclosure here, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims.

What is claimed is:

1. A method for adjusting a beam, comprising:
   determining, by a network device, at least one beam adjustment parameter, wherein the at least one beam adjustment parameter is configured to adjust a beam within an information transmission interval;
   sending, by the network device, the at least one beam adjustment parameter to a terminal, wherein the at least one beam adjustment parameter comprises at least one beam adjustment angle and at least one beam adjustment period; and
   the method further comprising at least one of following steps:
   adjusting, by the network device, a direction of a sending beam within the information transmission interval according to a specified beam adjustment period and a specified beam adjustment angle on the basis of a dimensional beam direction corresponding to a reference sending beam; or
   adjusting, by the network device, a direction of a receiving beam within the information transmission interval according to a specified beam adjustment period and a specified beam adjustment angle on the basis of a dimensional beam direction corresponding to a reference receiving beam.

2. The method of claim 1, wherein, the at least one beam adjustment parameter is predicted based on at least one determined beam;
   wherein, the at least one determined beam comprise one or more beams determined in a specific time.

3. The method of claim 1,
   wherein, the at least one beam adjustment angle comprises one or more beam adjustment angles in one or more dimensional beam directions.

4. The method of claim 1, further comprising:
   sending, by the network device, index information of a reference beam.

5. The method of claim 1, wherein, the reference sending beam comprises a sending beam recently used before the information transmission interval or a specified sending beam.

6. The method of claim 1, wherein, the reference receiving beam comprises a receiving beam recently used before the information transmission interval or a specified receiving beam.

7. A method for adjusting a beam, comprising:
   receiving, by a terminal, at least one beam adjustment parameter sent by a network device, wherein the at least one beam adjustment parameter is configured to adjust a beam within an information transmission interval,
   wherein the at least one beam adjustment parameter comprises at least one beam adjustment angle and at least one beam adjustment period; and
   the method further comprising at least one of following steps:
   adjusting, by the terminal, a direction of a sending beam within the information transmission interval according to a specified beam adjustment period and a specified beam adjustment angle on the basis of a dimensional beam direction corresponding to a reference sending beam; or
   adjusting, by the terminal, a direction of a receiving beam within the information transmission interval according to a specified beam adjustment period and a specified beam adjustment angle on the basis of a dimensional beam direction corresponding to a reference receiving beam.

8. The method of claim 7, wherein, the at least one beam adjustment parameter is predicted by a network device based on at least one determined beam;
   wherein, the at least one determined beam comprise one or more beams determined in a specified time.

9. The method of claim 7,
   wherein, the at least one beam adjustment angle comprise one or more beam adjustment angles in one or more dimensional beam directions.

10. The method of claim 7, further comprising:
    receiving, by the terminal, index information of a reference beam.

11. The method of claim 7, wherein, the reference sending beam comprises a sending beam recently used before the information transmission interval or a specified sending beam.

12. The method of claim 7, wherein, the reference receiving beam comprises a receiving beam recently used before the information transmission interval or a specified receiving beam.

13. A network device, comprising:
a processor; and
a memory configured to store instructions executable by the processor;
wherein, the processor is configured to:
determine at least one beam adjustment parameter, wherein the at least one beam adjustment parameter is configured to adjust a beam within an information transmission interval;
send the at least one beam adjustment parameter to a terminal, wherein the at least one beam adjustment parameter comprises at least one beam adjustment angle and at least one beam adjustment period; and
the processor is further configured to perform at least one of following steps:
adjusting a direction of a sending beam within the information transmission interval according to a specified beam adjustment period and a specified beam adjustment angle on the basis of a dimensional beam direction corresponding to a reference sending beam; or
adjusting a direction of a receiving beam within the information transmission interval according to a specified beam adjustment period and a specified beam adjustment angle on the basis of a dimensional beam direction corresponding to a reference receiving beam.

14. A terminal, comprising:
a processor; and
a memory configured to store instructions executable by the processor;
wherein, the processor is configured to:
receive at least one beam adjustment parameter, wherein the at least one beam adjustment parameter is configured to adjust a beam within an information transmission interval, wherein the at least one beam adjustment parameter comprises at least one beam adjustment angle and at least one beam adjustment period; and
the processor is further configured to perform at least one of following steps:
adjusting a direction of a sending beam within the information transmission interval according to a specified beam adjustment period and a specified beam adjustment angle on the basis of a dimensional beam direction corresponding to a reference sending beam; or
adjusting a direction of a receiving beam within the information transmission interval according to a specified beam adjustment period and a specified beam adjustment angle on the basis of a dimensional beam direction corresponding to a reference receiving beam.

* * * * *